May 8, 1923.  1,454,829
T. H. BELL ET AL
SPRING RIM
Original Filed Nov. 27, 1920
Fig. 1.
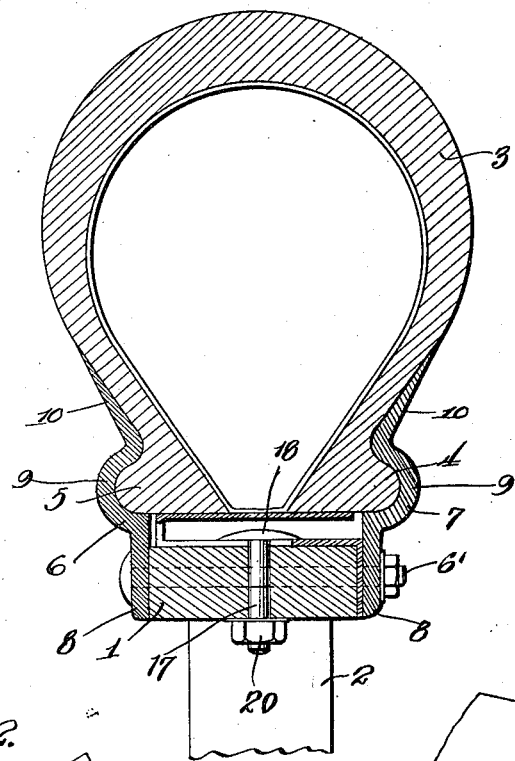
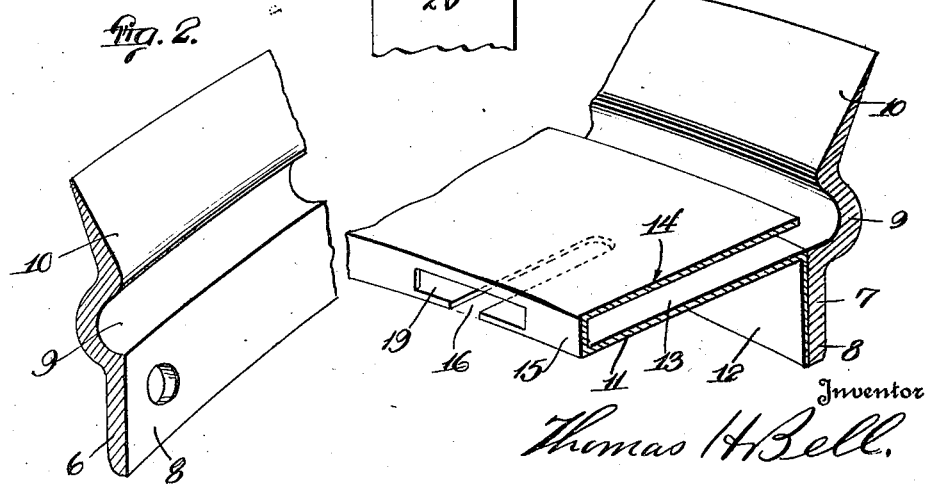
Fig. 2.   Fig. 3.
Inventor
Thomas H Bell.
John G. Schoenleber.

Patented May 8, 1923.

1,454,829

UNITED STATES PATENT OFFICE.

THOMAS H. BELL, OF NEW YORK, AND JOHN G. SCHOENLEBER, OF BROOKLYN, NEW YORK.

SPRING RIM.

Application filed November 27, 1920, Serial No. 426,725. Renewed March 21, 1923.

*To all whom it may concern:*

Be it known that we, THOMAS H. BELL and JOHN G. SCHOENLEBER, citizens of the United States, residing at New York city, in the county of New York and borough of Brooklyn, respectively, State of New York, have invented certain new and useful Improvements in a Spring Rim, of which the following is a specification.

This invention relates to improvements in resilient vehicle wheels and more particularly to a spring rim or band to be employed for giving a greater resiliency to a tire mounted upon an automobile wheel felly.

The primary object of the invention is to provide a spring rim or band extending around the felly of the wheel and adapted to co-operate with side gripping members whereby the tire mounted upon the wheel will be resiliently supported so that greater spring action will occur when the device is in use.

Other objects of the invention will appear upon consideration of the following description and accompanying drawings, wherein:—

Figure 1 is a cross section through the device constructed in accordance with our invention, Figure 2 is a fragmentary perspective view of a portion of one of the gripping members, and Figure 3 is a fragmentary perspective view of the opposite gripping member with the spring band mounted thereon.

Referring to the drawing by numerals, the wheel felly 1 is supported in the usual manner by the spokes one of which is indicated at 2. The automobile tire 3 is of the usual construction and is provided with the usual annular beads 4 and 5. Fastening bolts 6' are extended transversely through openings provided in the wheel felly 1 and these bolts hold the side gripping member 6 to the side of the felly 1. The opposite side gripping member 7 is also held in position by the fastening bolts on the opposite side of the felly 1. Each gripping member consists of a fastening plate 8 provided with a channel portion 9 and a gripping flange 10, the channel portion being adapted to receive one of the annular beads 4 or 5 while the gripping or retaining flange 10 engages a portion of the side of the tire as shown to advantage in Fig. 1.

The spring rim or band 11 consists of a relatively thin metal structure having an attaching flange 12 which is interposed between the gripping member 7 and the corresponding side of the rim or felly 1. This flange 12 may be welded or otherwise suitably fastened to the flange 8 of the gripping member. The spring band is shaped to provide superposed bands 13 and 14 radially spaced apart and connected together at one side by a wall 15 so that the outer band 14 is in a position to engage the inner surface of the tire as shown in Fig. 1. Inasmuch as the band 14 is merely held by the wall 15 it will be obvious that a certain spring action will occur so that the desired resiliency will be obtained. The band 13 which engages the felly 1 is provided with transverse slots 16 through which fastening bolts 17 are extended, the bolts being provided with heads 18 which are placed in position by passing them through side openings 19 in the wall 15. Fastening nuts 20 are employed to maintain the bolts in position and since the bolts extend through the felly 1 it will be obvious that the spring band will be held in the position shown in Fig. 1 to resiliently support the central portion of the tire so that lateral displacement of the tire is prevented by the retaining members on the sides of the felly.

Minor changes may be made in the details of construction without departing from the spirit of the invention or the scope of the claims hereunto appended.

What is claimed is:—

1. In combination with a wheel having a felly and a tire to be mounted on the felly, side gripping members fixed to the opposite sides of the felly and having retaining flanges to engage opposite sides of the tire, a rim having a fastening flange interposed between one of the gripping members and one side of the wheel felly and including radially spaced apart bands, the said bands being connected together at one edge of each band whereby the outermost band will resiliently engage the innermost surface of the tire.

2. In combination with a vehicle wheel having an annular felly and a tire to be mounted on the felly, retaining elements attached to opposite sides of the felly and including channel portions to engage the annular beads on the tire, retaining flanges formed on the said retaining elements to engage opposite sides of the said tire outward of the said annular beads, a rim including spaced apart annular bands having their marginal edges connected at one side whereby the said bands are held in resiliently spaced relation, and means to secure the said rim to the felly.

3. A spring rim for vehicle wheels comprising a pair of radially spaced bands, a wall connecting the bands at one side, a plurality of slots through said wall and one of said bands, and fastening means received by the slots for securing the rim to the wheel.

In testimony whereof, we affix our signatures.

THOMAS H. BELL.
JOHN G. SCHOENLEBER.